Oct. 26, 1943.   C. STAFF ET AL   2,332,832
MILK PRODUCTION CURVE
Filed July 27, 1942
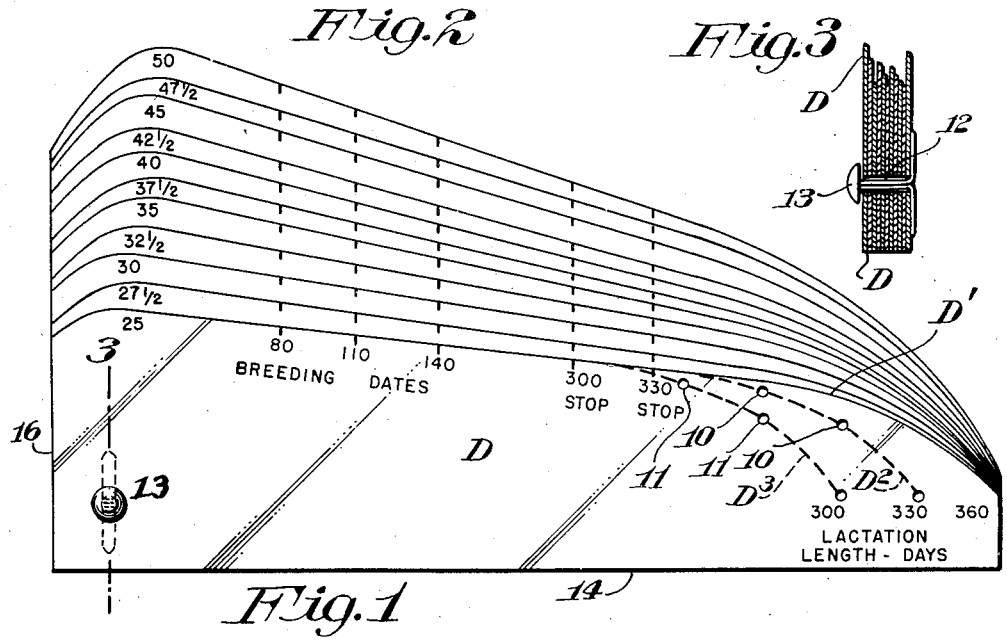
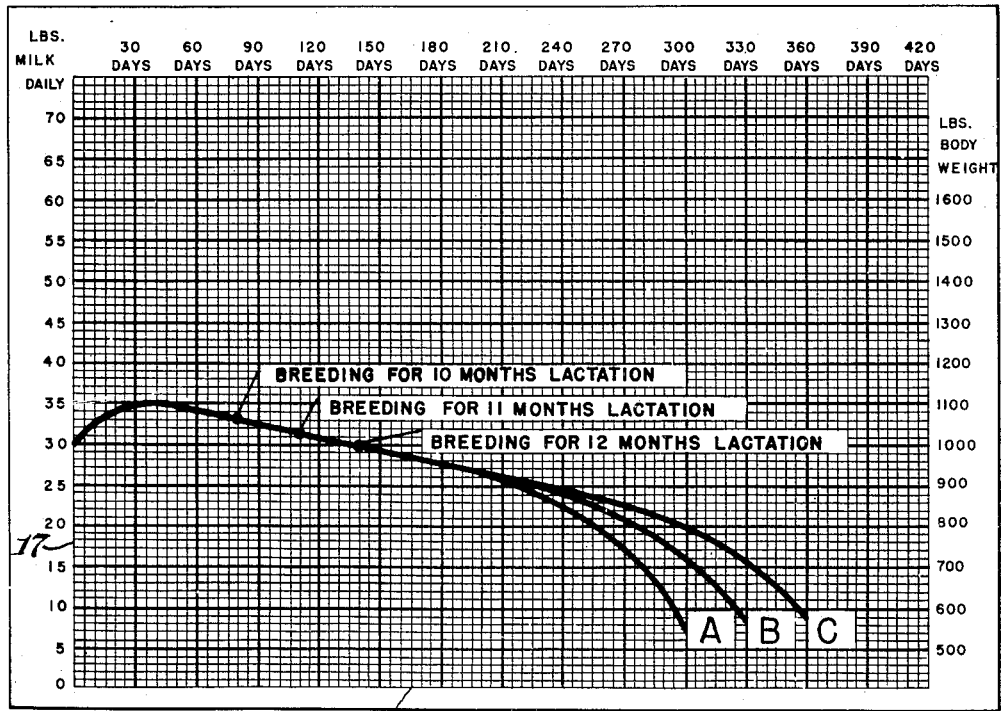
Inventors
CHARLES STAFF
NORMAN E. DEWES Patented Oct. 26, 1943

2,332,832

UNITED STATES PATENT OFFICE 2,332,832

MILK PRODUCTION CURVE

Charles Staff, Pleasant Ridge, and Norman E. Dewes, Royal Oak, Mich., assignors to General Mills, Inc., a corporation of Delaware Application July 27, 1942, Serial No. 452,462

2 Claims. (Cl. 35—24)

An object of this invention is to provide a ready means for estimating the normal daily yield of milk during a given period of lactation for a given cow based on her yields for the first forty days after that lactation begins.

Heretofore, there has been little information available in usable form by means of which a dairyman could estimate the normal yield for a particular cow over her period of lactation.

This and other objects as will hereinafter appear are accomplished by this invention which is fully described in the following specification and shown in the accompanying drawing in which Figure 1 is a graph plotted on suitable coordinates showing the normal milk production or lactation of the cow based on a maximum yield of 35 lbs. of milk per day at about 40 days after lactation begins;

Fig. 2 is a front elevation showing a series of enlarged curves or templets preferably made of thin transparent sheets such as Celluloid or Cellophane, etc., each having an edge corresponding to maximum milk yields of from 25 to 50 lbs. per day; and Fig. 3 is a partial transverse section on the line 3 of Fig. 2.

In Fig. 1 is shown a graph plotted on coordinate paper, the ordinates corresponding to a year or more of time in intervals of 5 days, while the abscissa corresponds to the milk production of cows in terms of pounds per day. In this case, there are three superposed graphs shown, these graphs being the same for about the first 200 days, the graph thereafter depending on the breeding date of this particular cow. Thus the graph A starts to turn rather sharply down at about 200 days after lactation begins and corresponds to a breeding date of 80 days. The graph B on the other hand corresponds to a breeding date of 110 days and the graph C to a breeding date of 140 days. These graphs we have established as a result of several years of study, and correspond to the normal production of a large number of healthy dairy type cows, properly fed, in good environment, and under proper care and management, having a maximum milk production of approximately 35 lbs., which for this production occurs about 40 days after lactation begins.

Of the curves shown in Fig. 2, that marked 35 corresponds to the curve C of Fig. 1 but each graph carries an outline in dotted lines for graphs A and B corresponding to breeding dates at 80 and 110 days, respectively.

Thus Figs. 2 and 3 represent a series of relatively thin transparent curves or templets, as of Celluloid, Cellophane or similar transparent material, like D which is the topmost one of the pile shown in Fig. 2 with a top edge D' corresponding to a 12 months' lactation. A series of holes 10 in the curve D provide means for the insertion therein of a pencil point so that a graph $D^2$ may be drawn corresponding to an 11 months' lactation such as is shown in the curve B of Fig. 1. Also a series of holes 11 are provided in the curve D for the insertion of a pencil point whereby a curve $D^3$ may be drawn corresponding to a 10 months' lactation.

Similar holes are provided in each of the curves or templets which, for convenience, are provided with corresponding holes 12 through which passes a brass paper fastener 13 so that they are held together but any curve can readily be removed for use.

In using these curves, the dairyman plots the milk production of each cow separately on coordinate paper such as that shown in Fig. 1 and is able to determine the cow's maximum milk production in about 40 days after lactation begins. He then selects one of the curves of the group shown in Fig. 2 corresponding to this maximum production and lays this curve with its base 14 (Fig. 2) on the zero line 15 of Fig. 1 and proceeds to draw with a pencil or pen a graph corresponding to the curves A, B or C of Fig. 1, selecting the one which corresponds to the period of lactation which he desires this particular cow to have. My experience has been that when a graph based upon this data is thus obtained, it should correspond very closely to the expected production of the cow, provided she remains in good health, has been properly fed, kept under good environment, and has received proper care and management.

The standard graph thus obtained for a cow having a certain peak production is intended to show the normal milk production to be expected of a healthy dairy type cow, properly fed, in good environment, and under proper care and management. Adherence of her milk production to the standard graph indicates that all the controlling conditions have been satisfied; failure to do so indicates some abnormal circumstance, to be determined by investigation.

While the curves shown in Fig. 2 cover the range of 25 lbs. to 50 lbs. daily milk production, it is desired to use graphs like these by 2½ lb. intervals to and including 85 lb. production. The larger curves are omitted to save space, those illustrated being sufficient to show the procedure.

While we have shown and described but a single embodiment of this invention, it is to be understood that it is capable of many modifications. Changes, therefore, in the construction and arrangement may be made which do not depart from the spirit and scope of the invention as disclosed in the appended claims.

We claim as our invention:

1. A template for producing a plurality of graphs of a cow's normal daily milk production with respect to time, each of said graphs being for a different lactation period, comprising a sheet having a graph edge which has an outline corresponding to the graph for the longest lactation period, perforations in the sheet to indicate part of the course of the graph for shorter lactation periods and indicia along said graph edge to indicate the points at which the respective graphs of shorter lactation periods deviate from the graph of the longest lactation period.

2. An assembly of templates comprising a plurality of templates as defined in claim 1, each of said templates corresponding to the graph of a particular maximum daily milk production, said templates covering a range of maximum milk production and being superimposed one upon another in the order of the decreasing milk production, the outlines of the sheets coinciding except for the graph edge, and fastening means holding the templates together in the assembly permitting each of the templates, while maintained in the assembly, to be separated from the remainder of the templates sufficiently to allow a graph to be drawn from it.

CHARLES STAFF.
NORMAN E. DEWES.